(12) United States Patent
Geisberger

(10) Patent No.: US 10,126,128 B2
(45) Date of Patent: Nov. 13, 2018

(54) ANGULAR RATE SENSOR

(71) Applicant: FREESCALE SEMICONDUCTOR, INC., Austin, TX (US)

(72) Inventor: Aaron A. Geisberger, Austin, TX (US)

(73) Assignee: NXP USA, Inc., Austin, TX (US)

( * ) Notice: Subject to any disclaimer, the term of this patent is extended or adjusted under 35 U.S.C. 154(b) by 212 days.

(21) Appl. No.: 15/165,047

(22) Filed: May 26, 2016

(65) Prior Publication Data

US 2017/0343350 A1    Nov. 30, 2017

(51) Int. Cl.
*G01C 19/5712* (2012.01)

(52) U.S. Cl.
CPC .............................. *G01C 19/5712* (2013.01)

(58) Field of Classification Search
CPC ..................... G01C 19/5712; G01C 19/5705
See application file for complete search history.

(56) References Cited

U.S. PATENT DOCUMENTS

| | | | |
|---|---|---|---|
| 6,796,178 B2 | 9/2004 | Jeong et al. | |
| 6,915,693 B2 | 7/2005 | Kim et al. | |
| 6,939,473 B2 | 9/2005 | Nasiri et al. | |
| 7,093,486 B2 | 8/2006 | Challoner et al. | |
| 7,621,183 B2 * | 11/2009 | Seeger | G01C 19/5712 73/504.04 |
| 7,872,394 B1 | 1/2011 | Gritters et al. | |

OTHER PUBLICATIONS

Acar, C., "Structural design and experimental characterization of torsional micromachined gyroscopes with non-resonant drive mode", http://escholarship.org/uc/item/5g45t1h4, Journal of Micromechanics and vol. 14, No. 1, Jan. 1, 2014, 13 pages.

* cited by examiner

*Primary Examiner* — John Chapman, Jr.

(57) ABSTRACT

A MEMS sensor for measuring rotational motion about a first axis includes a frame, a base structure under the frame, a drive mass mounted in the frame for rotational movement about a second axis perpendicular to the first axis, and a first drive paddle in the drive mass. A first link includes a first end coupled to a first spring that movably couples the first drive paddle to the drive mass and a second end coupled to a second spring that movably couples the first link to the frame. A drive system includes an electrode aligned to exert electromotive force to pivot the first drive paddle and move the drive mass about the second axis. Deflection of the drive mass is greater than deflection of the first drive paddle when the drive system is operating.

20 Claims, 12 Drawing Sheets

ANGULAR RATE SENSOR

BACKGROUND

Field of the Invention

The present invention is directed in general to the field of Micro-Electro-Mechanical Systems (MEMS). In one aspect, the present invention relates to MEMS angular rate sensors and methods for operating same.

Description of the Related Art

Micro-Electro-Mechanical Systems (MEMS) technology is increasingly used to integrate mechanical elements, sensors, actuators, and electronics onto very small mechanical structures using conventional batch semiconductor processing techniques. For example, inertial sensors may be formed with MEMS devices on an integrated circuit wafer substrate to form various applications, such as a MEMS gyroscope that is used to detect the angular velocity. However, conventional MEMS gyroscopes have performance limitations that result from various design and manufacturing imperfections.

One characteristic of a MEMS gyroscope is its resonant frequency response. A measure of the frequency response is called the quality factor, which may be referred to as the Q factor of a device. The Q factor measures the sharpness of the resonant peak. A higher value indicates a sharper peak. For a MEMS gyroscope to achieve desirable sensitivity, it must achieve velocity of a moving mass and therefore large amplitude of vibration. This amplitude is often referred to as the drive amplitude achieved through the drive resonance. A high Q level is normally desired to achieve the desired drive amplitude with low levels of force from driving electronics and MEMS actuation elements. For certain drive actuation schemes, such as vertically driven masses that are more subject to factors that reduce the Q level, there is a need to improve the driving mechanism such that the MEMS gyroscope apparatus, system and method of operation that allows for lower Q factor but does not place significant burden on the driving electronics.

BRIEF DESCRIPTION OF THE DRAWINGS

Embodiments of the present invention may be understood, and related numerous objects, features and advantages obtained, when the following detailed description is considered in conjunction with the following drawings, in which.

DETAILED DESCRIPTION

A MEMs angular rate sensor, implemented as a vertical torsion driven gyroscope sensor, and associated methodology of operation are described which provide desirable drive operating amplitudes under a low quality level by incorporating drive paddles located close to the center of a drive mass and linked to the sense frame with a motion amplification structure. The amplification structure directs the drive paddles to move in a motion sufficiently like a parallel plate actuator. This motion amplification structure enables a large force and small displacement of the parallel plate actuator drive paddle to be used efficiently to achieve the desired drive amplitude of a mass at an achievable quality level. With the drive motion and velocity directed approximately vertically, lateral sense fingers can be used to detect the in-plane motions of the gyroscope that are induced by Coriolis forces from the device being subject to angular rate motion about an axis in-plane but orthogonal to the approximate axis of drive motion.

Various illustrative embodiments of the present invention will now be described in detail with reference to the accompanying figures which illustrate different views of an angular rate sensor. It should be appreciated that the angular rate sensor may be formed with different materials or shapes than set forth herein. For the sake of brevity, conventional techniques related to semiconductor processing, MEMS processing, and sensor technology are not described herein. While various details are set forth in the following description, it will be appreciated that the present invention may be practiced without these specific details, and that numerous implementation-specific decisions may be made to the invention described herein to achieve the device designer's specific goals, such as compliance with process technology or design-related constraints, which will vary from one implementation to another. While such a development effort might be complex and time-consuming, it would nevertheless be a routine undertaking for those of ordinary skill in the art having the benefit of this disclosure. For example, selected aspects are depicted with reference to simplified plan and cross sectional views of a MEMS device without including every device feature or geometry in order to avoid limiting or obscuring the present invention. In addition, circuit details, such as drive and sense signal circuits, have not been explained in any greater extent since such details are well known and not considered necessary to teach one skilled in the art of how to make or use the present invention. Such descriptions and representations are used by those skilled in the art to describe and convey the substance of their work to others skilled in the art.

Figure 1:
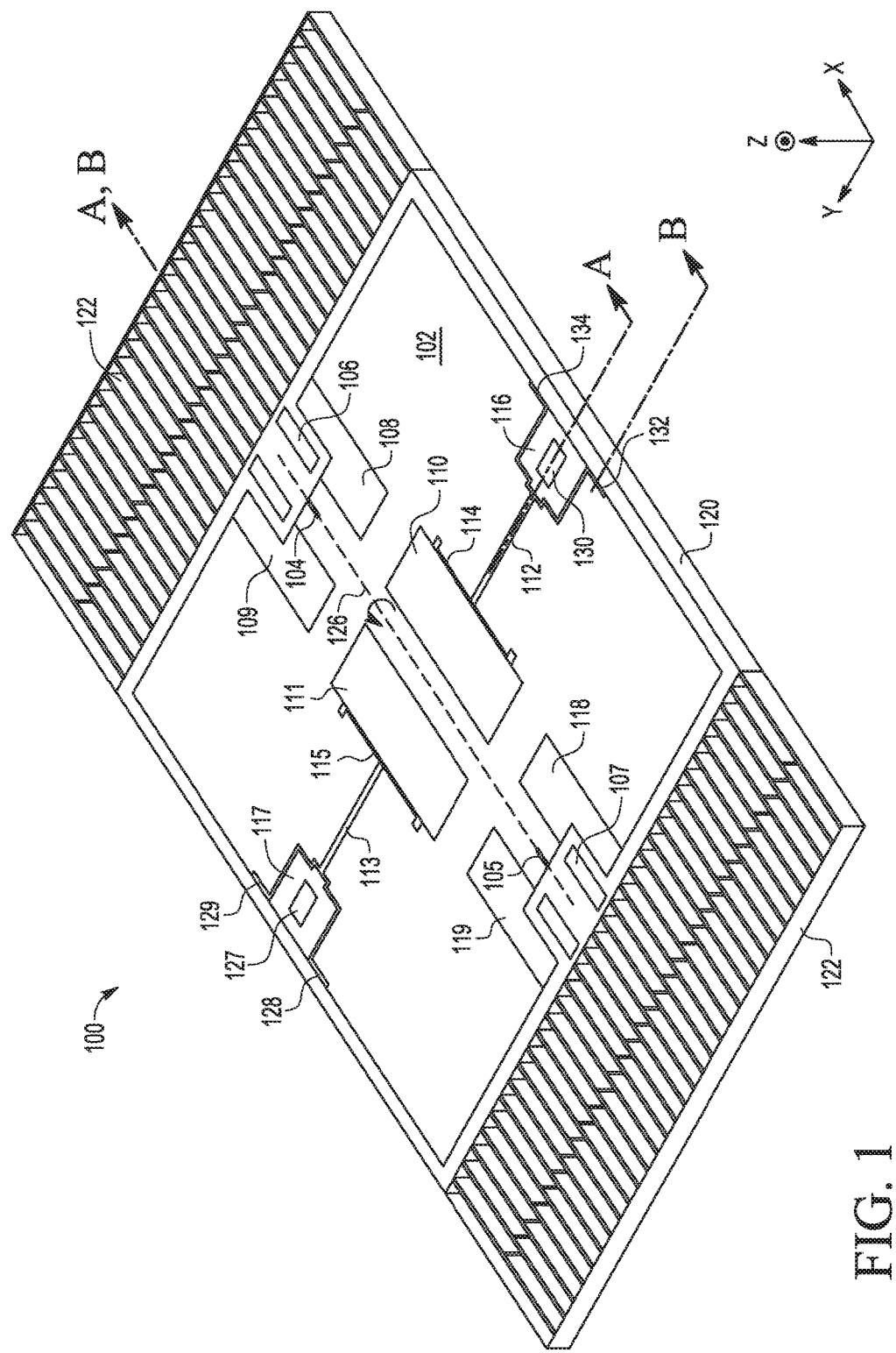
FIG. 1 illustrates a perspective view of an angular rate sensor in accordance with one embodiment of the present invention.

Turning now to FIG. 1, there is depicted in perspective view a mechanical model of an example angular rate sensor 100 (also referred to as a transducer) which is implemented as a MEMS-type vertical torsion driven gyroscope (also referred to as a "gyroscope," or simply "gyro") in accordance with selected embodiments of the present disclosure. Depicted in FIG. 1 is a reference diagram for 3-axes: the x-axis, y-axis, and z-axis. Angular rate sensor 100 includes a pair of drive paddles 110 and 111 configured to undergo oscillatory motion substantially similar to a parallel plate and moving approximate to the z-axis. Each of drive paddles are connected via a drive link 112 and 113, respectively, to a frame 120. Drive link 112 extends from drive paddle 110 towards frame 120 and bifurcates to go around a substrate anchor 130 and attach to frame 120 at either side of anchor 130 via connections points 132 and 134. Similarly, drive link 113 extends from drive paddle 111 towards an opposing side of frame 120 and bifurcates to go around a substrate anchor 127 and attach to frame 120 at either side of anchor 127 via connection points 128 and 129. Connection points 132, 134, 128, and 129 may include torsion springs. As will be seen in the cross sections below, drive links 112 and 113 are connected in a fixed manner to drive paddles 110 and 111, respectively, and substrate anchors 130 and 127 are attached to the underlying substrate (not visible in FIG. 1). Substrate anchor 130 is linked to frame 120 via spring 116, and substrate anchor 127 is linked to frame 120 via spring 117. Springs 116 and 117 are designed to exhibit relatively high stiffness in the vertical direction while allowing in plane motions of frame 120 in a direction approximate to the denoted x-axis.

Angular rate sensor 100 also includes drive mass 102 which is configured to operate as part of the motion amplification structure. Drive mass 102 is linked to drive paddles 110 and 111 via torsion springs 114 and 115, respectively. Drive mass 102 rotates about its axis of rotation 126 which is parallel to the x-axis. Drive mass 102 is linked to frame 120 at by torsion springs 104 and 105 at opposite ends of axis 126. Areas 106 and 107 include a substrate anchor, similar to substrate anchors 130 and 127, and a spring, similar to springs 116 and 117, to link each substrate anchor to frame 120 at opposite ends of axis 126. Spring 106 and 107 are designed to exhibit relatively high stiffness in the vertical direction while allowing in plane motions of frame 120 in a direction approximate to the denoted y-axis.

Angular rate sensor 100 also includes sense fingers, such as sense finger 122, which are attached to frame 120 and used to detect the rotation of frame 120 about the z-axis, via the described compliance of springs 106, 107, 116, and 117. As will be described in more detail below, each sense finger includes a capacitive element to detect the rotation. Angular rate sensor 100 also includes electrodes 108, 109, 118, and 119 to detect the amplitude of displacement of drive mass 102. These regions form a capacitance with an underlying electrode, and during a drive mode in which the drive paddles are being driven in an oscillatory motion, these electrodes provide feedback used to determine the amplitude of drive mass 102 reached at resonating frequency.

In operation, during a drive mode, a voltage is applied in an alternating manner to electrodes under drive paddles 110 and 111 creating a force that causes paddles 110 and 111 to rotate about the x-axis, with pivot point locations approximately at substrate anchors 130 and 127, respectively. As paddle 110 moves upward in the z direction, paddle 111 moves downwards in the z direction, about the x-axis, and vice versa. Note that the driven direction is the direction of the z-axis. Due to torsion spring 114, when drive paddle 110 moves upwards, the corresponding half of drive mass 102 moves upwards as well in the z-direction, rotating about axis 126, but at a greater angle of rotation than drive paddle 110. When drive paddle 110 moves downwards in the z-direction, then the corresponding half of drive mass 102 moves downwards, but at a greater angle of rotation than drive paddle 110. Similarly, when drive paddle 111 moves upwards, due to torsion spring 115, the corresponding half of drive mass 102 moves upwards as well in the z-direction, rotating about axis 126, but at a greater angle of rotation than drive paddle 111. When drive paddle 111 moves downwards in the z-direction, then the corresponding half of drive mass 102 moves downwards, but at a greater angle of rotation than drive paddle 111. The greater angle of rotation of drive mass 102 is desirable for achieving larger drive oscillation amplitudes and therefore velocity to enhance the aforementioned gyroscope performance. In one embodiment, during the drive motion, the rate of oscillation of drive paddles 110 and 111 is in the range of 20 kHz.

In the illustrated embodiment, torsion spring 114 is connected to drive mass 102 at the junction of drive paddle 110 and drive link 112. Alternatively, torsion spring 114 can be connected to drive mass 102 further down drive link 112, closer to substrate anchor 130. Similarly, torsion spring 115 can be connected to drive mass 102 further down drive link 113, closer to substrate anchor 127. This will reduce the range of rotational motion of drive mass 102 about axis 126.

Figure 2:
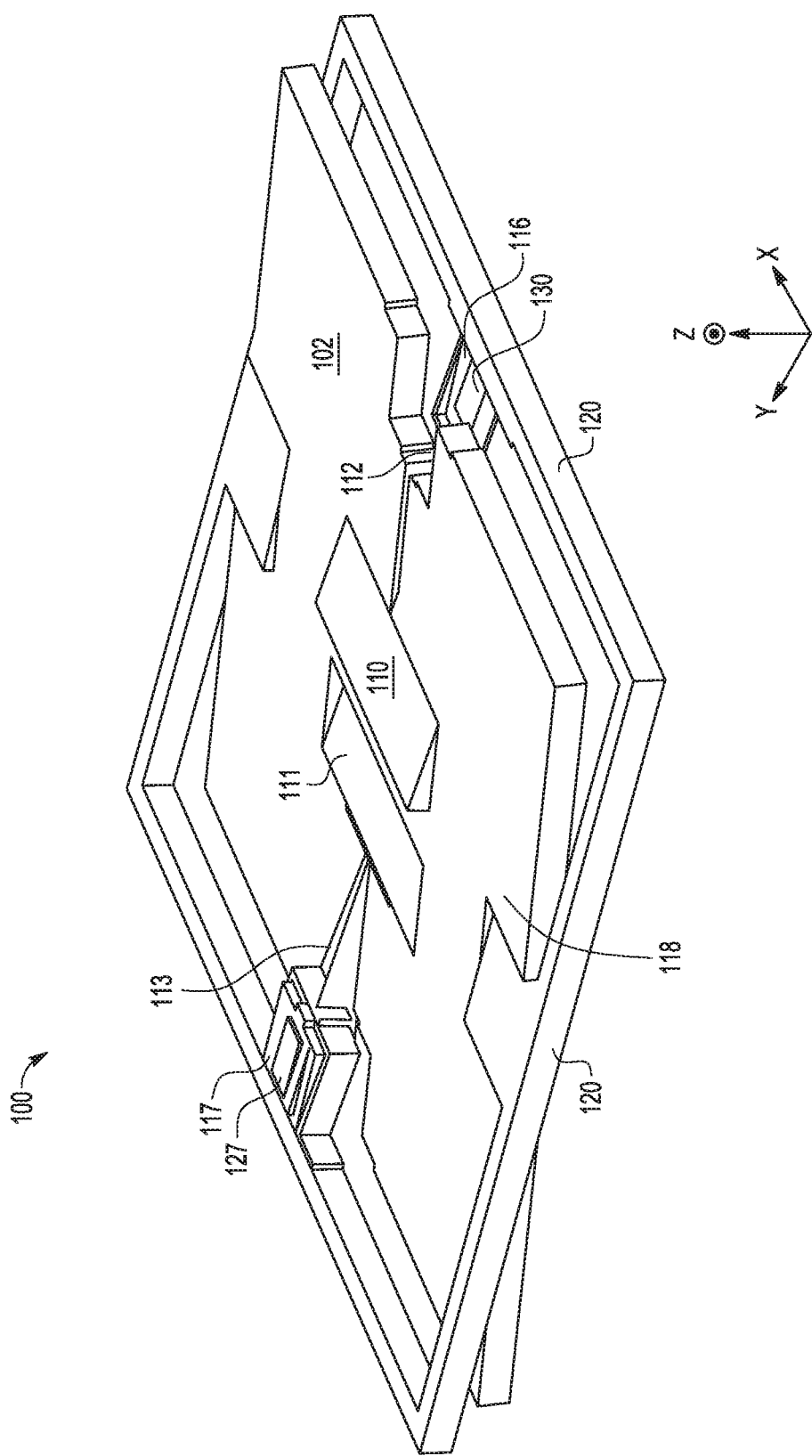
FIG. 2 illustrates a perspective view of the angular rate sensor of FIG. 1 when in motion, in accordance with one embodiment of the present invention.

FIG. 2 illustrates angular rate sensor 100 during a drive mode of operation. In the particular frame of motion illustrated in FIG. 2, drive paddle 110 is in the upwards position and drive paddle 111 is in the downward position along the driven direction (the z-axis). Therefore, the half of drive mass 102 corresponding to drive paddle 110 (the right half of drive mass 102) is also in an upwards position, exhibiting a particular amplitude that is greater degree of amplitude than drive paddle 110. The half of drive mass 102 corresponding to drive paddle 111 (the left half of drive mass 102) is in a downwards position, exhibiting a greater degree of amplitude than drive paddle 111 (but in the opposite direction as the right half of drive mass 102). As discussed above, during drive mode, it is desirable to achieve the resonating frequency which provides the maximum degree of amplitude, and electrodes 108, 109, 118, and 119 can be used to determine if the appropriate amplitude has been achieved.

Once in the drive mode, angular rate sensor 100 is ready to detect angular motion. When there is an angular rate of motion of angular rate sensor 100 about the y-axis, a torque is imparted about the z-axis due to Coriolis forces acting on the velocity of drive mass 102 as it rotates in an oscillatory motion about axis 126. The oscillatory torque about the z-axis generated from the Coriolis forces excite that sense vibration mode. Torque on drive mass 102 is transferred to frame 120 through torsion springs 104 and 105 which are relatively stiff to y-axis deformation and therefore frame 120 rotates about the z-axis in response to the Coriolis forces. The described z-axis rotation motion of frame 120 is the sense vibration mode and is permitted though the configuration of springs 106, 107, 116, and 117. The sense rotation motion of frame 120 changes the capacitance of the sense fingers, such as finger 122, and thus motion of frame 120 is detected, indicating an angular rate of motion of angular sensor 100.

Figure 3:
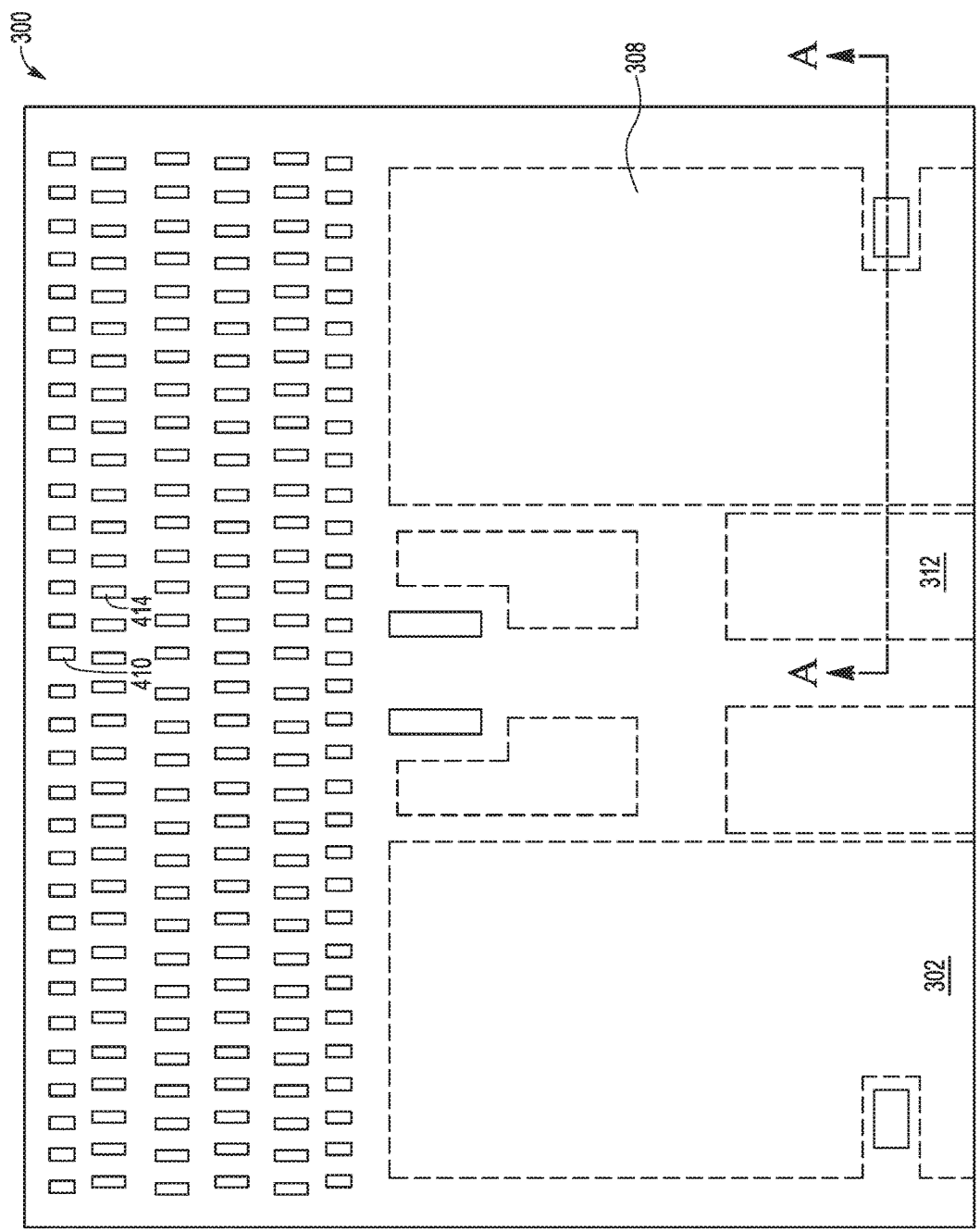
FIG. 3 illustrates a top down view of the angular rate sensor of FIG. 1 at a stage in processing with a first cross section location, A, indicated, in accordance with one embodiment of the present invention.
Figure 4:
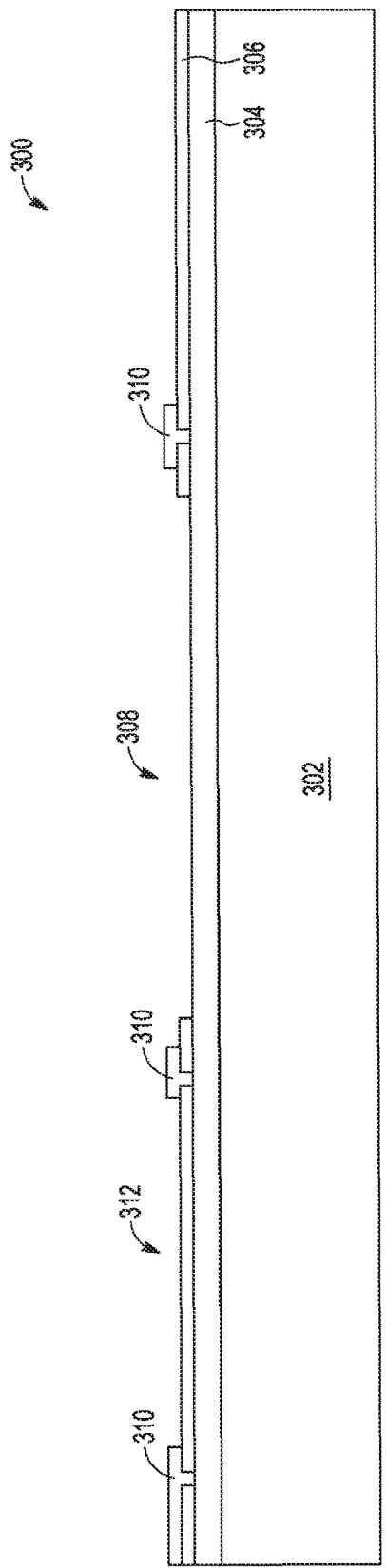
FIGS. 4-7 illustrate, in cross-sectional views, the angular rate sensor of FIG. 1 at various stages in processing taken through the first cross section location, A.

FIG. 3 illustrates a top down view of a substrate 302 including an electrode region 312, an opening 308, and contacts 410 and 414. Also indicated in FIG. 3 is a first cross-section location A in which FIGS. 4-7 correspond to cross-sectional views at various stages in processing corresponding to cross-section location A. FIG. 4 illustrates, in cross-sectional form, a base structure 300 of angular rate sensor 100 at a stage in processing. Base structure 300 includes a substrate 302. Substrate 302 can be any semiconductor substrate having any semiconductor material or materials. A dielectric layer 304 is formed over substrate 302. Dielectric layer 304 may be an oxide or other material that can subsequently be removed selective to the remaining layers, such as substrate 302 and any overlying layers. A patterned semiconductor layer 306 is formed over dielectric layer 302 and includes electrode region 312 and defines an opening 308 in which dielectric layer 304 is exposed. An etch stop layer 310 is formed over patterned semiconductor layer 306 and is formed within openings of semiconductor layer 306 to contact underlying dielectric layer 304. Etch stop layer 310 may include, for example, silicon nitride.

Figure 5:
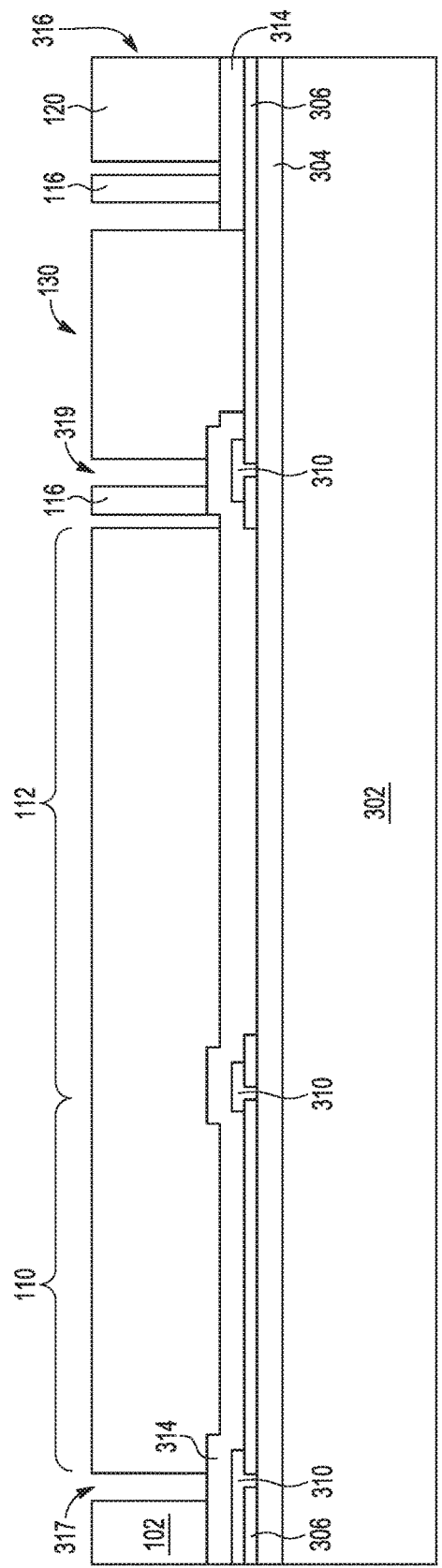

FIG. 5 illustrates, in cross-sectional form, angular rate sensor 100 of FIG. 4 at a subsequent stage in processing. A sacrificial layer 314 is formed over etch stop layer 310 and patterned semiconductor layer 306. In one embodiment, sacrificial layer 314 includes an oxide and may be the same material as dielectric layer 304. Sacrificial layer 314 is patterned to expose patterned semiconductor layer 306 where a substrate anchor will be formed. A device layer 316 is formed over semiconductor layer 306 and 314. Device layer 316 may be a polysilicon layer or a single crystal silicon layer. Device layer 316 is patterned to form different portions of angular rate sensor 100. For example, device layer 316 includes the drive paddle 110 over electrode region 312 and drive link 112 mechanically linked to drive paddle 110. Device layer 316 also includes spring 116 and anchor 130 which anchors device layer 316 to substrate 302 via patterned semiconductor layer 306 and dielectric layer 304. Device layer 316 also includes frame 120 and a portion of drive mass 102 which is physically separate from drive paddle 110. Spring 116 surrounds anchor 130 and is located between link 112 and anchor 130 and between anchor 130 and frame 120. Device layer 316 is also patterned to form openings which expose sacrificial layer 314, such as openings 317 and 319. Note that drive paddle 110 and drive link 112 are separate from drive mass 102. They are instead connected to drive mass 102 by torsion spring 114, as described above, but torsion spring 114 is not visible in the cross-sections of FIGS. 6 and 7. Also, note that drive link 112 is linked to frame 120 through torsion springs 132 and 134, and frame 120 is linked to substrate anchor 130 via spring 116.

Figure 6:
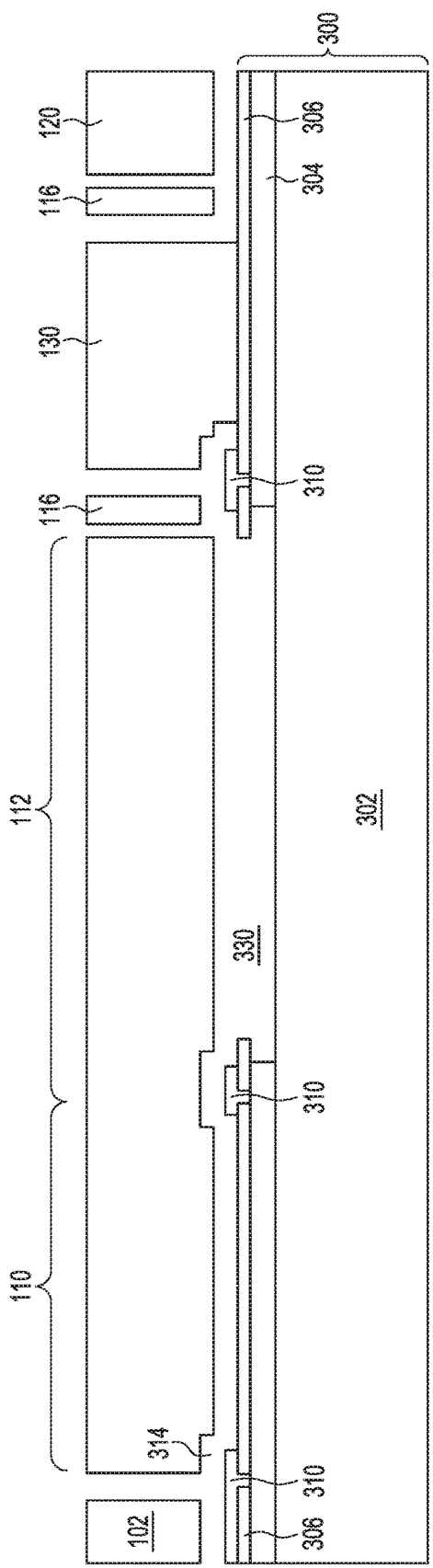

FIG. 6 illustrates, in cross-sectional form, angular rate sensor of FIG. 5 at a subsequent stage in processing. Sacrificial layer 314 and a portion of dielectric layer 304 are removed through the openings in device layer 316, such as openings 317 and 319. Sacrificial layer 314 is removed to create a gap 330 (also referred to as a cavity 330) between device layer 316 and the underlying layers. Therefore, there is a gap or cavity formed below drive mass 102, drive paddle 110, drive link 112, spring 116, and frame 120. This allows all these parts to have movement in the z-direction.

Figure 7:
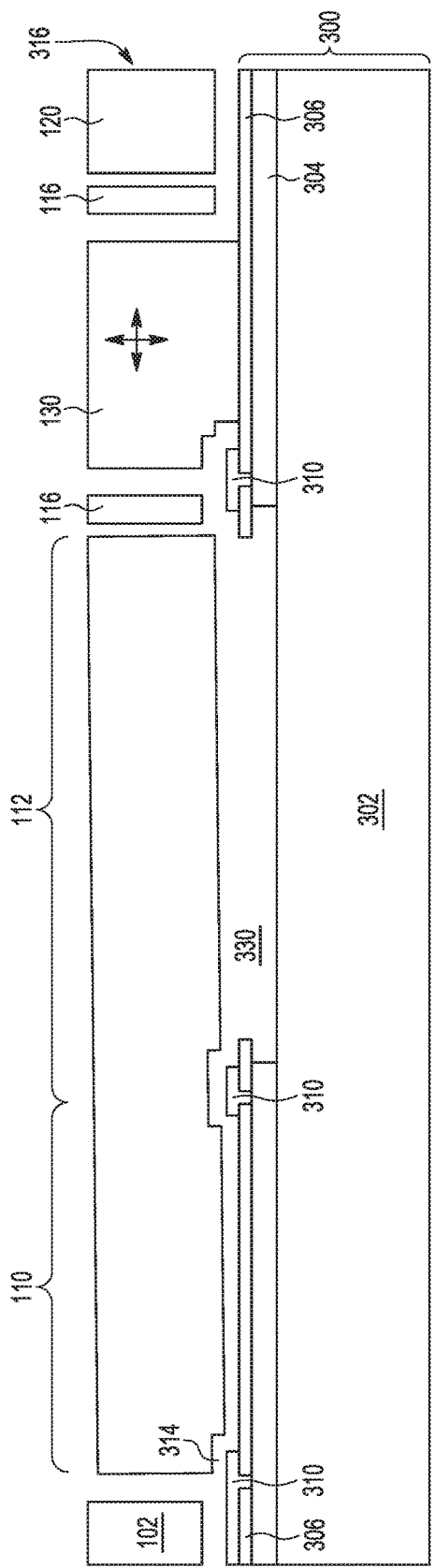

FIG. 7 illustrates, in cross-section form, angular rate sensor of FIG. 6 with movement in the z-direction of drive paddle 110 and drive link 112. Drive link 112 and drive paddle 110 pivot about substrate anchor 130 which functions as a pivot point. Therefore, in FIG. 7, drive paddle 110 and drive link 112 are illustrated with a small downward motion in the z-direction into underlying cavity 330. Torsion spring 132 and 134 allow this motion. Note that when drive paddle 110 and drive link 112 move downwards in the z-direction, due to torsion spring 114, drive mass 102 also moves downward, pivoting about axis 126, but in a greater range of motion than drive paddle 110. Again, cavity 330 underlies all of drive mass 102 (as well as drive paddle 111 and drive link 113). Electrode 312, under drive paddle 110, is used as a drive electrode to create the movement of drive paddle 110.

Figure 8:
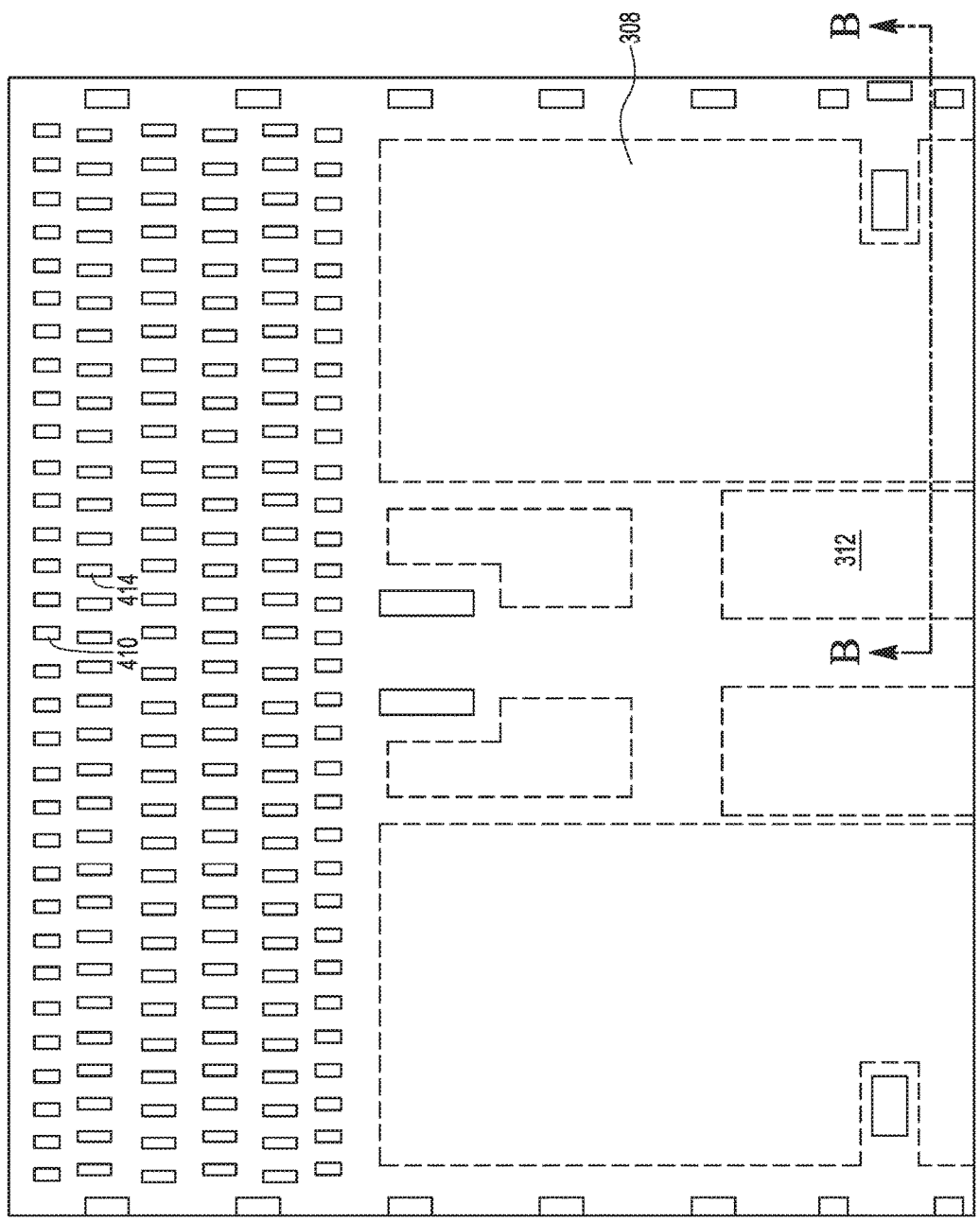
FIG. 8 illustrates a top down view of the angular rate sensor of FIG. 1 at a stage in processing with a second cross section location, B, indicated, in accordance with one embodiment of the present invention.
Figure 9:
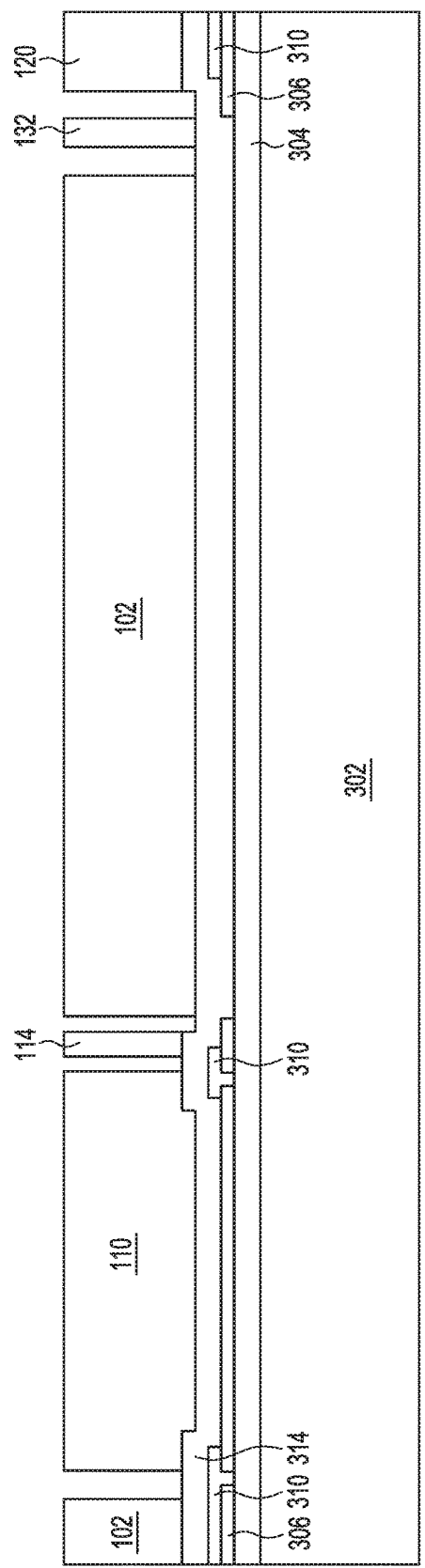
FIGS. 9-11 illustrate, in cross-sectional views, the angular rate sensor of FIG. 1 at various stages in processing taken through the second cross section location.
Figure 10:
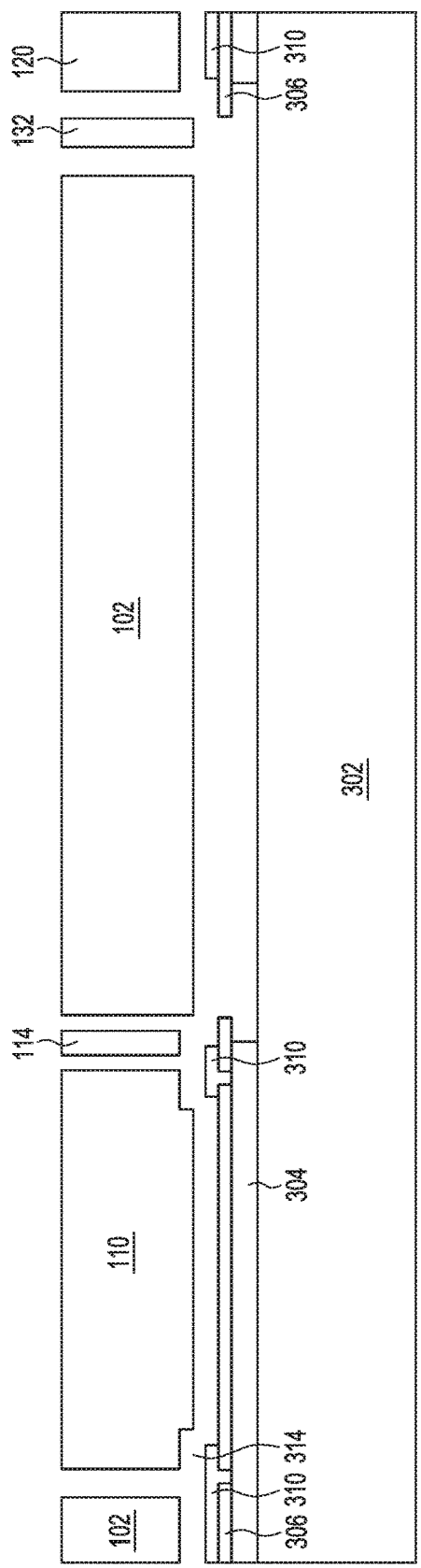
Figure 11:
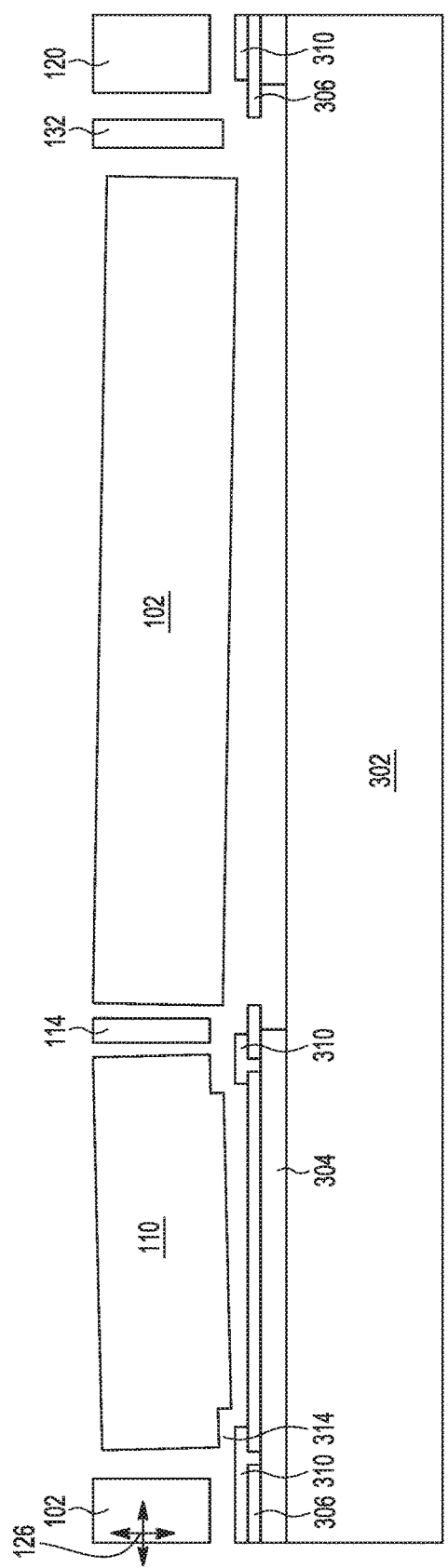

FIG. 8 illustrates the same top down view as FIG. 3, but with a second cross-section location B in which FIGS. 9-11 correspond to cross-sectional views at various stages in processing corresponding to cross-section location B. FIG. 9 illustrates a cross-sectional view of base structure 300 and device layer 316 at a stage in processing prior to removal of sacrificial layer 314, taken through cross-section location B. As described above in reference to FIG. 5, device layer 316 is patterned to form different portions of angular rate sensor 100. In the cross-section of FIG. 9, device layer 316 includes portions of drive mass 102, drive paddle 110, torsion spring 114, connection point and torsion spring 132, and frame 120. Device layer 316 is also patterned to include openings which expose sacrificial layer 314.

FIG. 10 illustrates, in cross-sectional form, angular rate sensor of FIG. 9 at a subsequent stage in processing. Sacrificial layer 314 and a portion of dielectric layer 304 are removed through the openings in device layer 316. Sacrificial layer 314 is removed to create gap 330 (also referred to as cavity 330) between device layer 316 and the underlying layers. Therefore, gap 330 is formed below drive mass 102, drive paddle 110, torsion spring 114, and frame 120. This allows all these parts to have movement in the z-direction.

FIG. 11 illustrates, in cross-section form, angular rate sensor of FIG. 10 with movement in the z-direction of drive mass 102. Drive mass 102 pivots about axis 126 which corresponds to the pivot point. Note that the pivot point for drive link 112 is located near connection point 132, behind the page at substrate anchor 130. Therefore, in FIG. 11, drive mass 102 is illustrated with a downward motion in the z-direction into underlying cavity 330. Note that torsion spring 114 links drive paddle 110 with drive mass 102 at the junction of drive paddle 110 and drive link 112. The proximity of spring 114 to the pivot point on axis 126 determines the angle that drive mass 102 receives and therefore the range of motion at the end of drive mass 102 (next to connection point 132).

Figure 12:
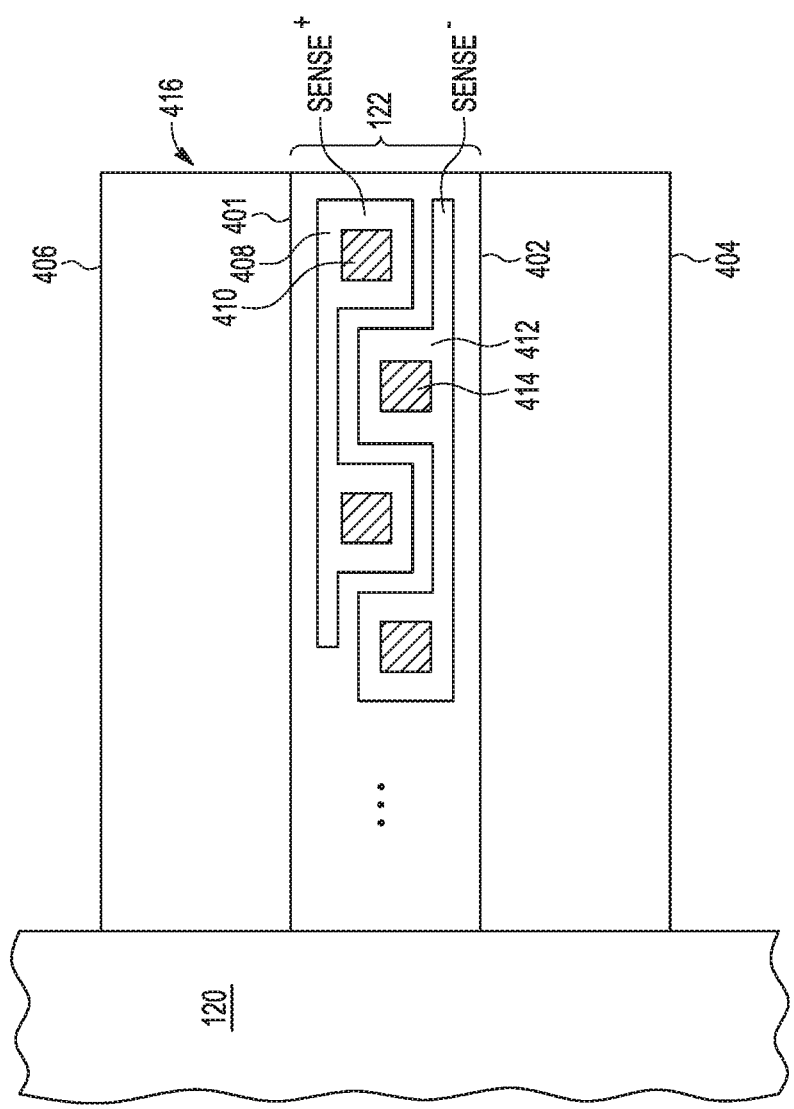
FIG. 12 illustrates a top down view of a portion of the angular rate sensor of FIG. 1, in accordance with one embodiment of the present invention.

FIG. 12 illustrates a top down view of a portion of the angular rate sensor 100, in accordance with one embodiment of the present invention. The illustrated portion of angular sensor 100 includes sense finger 122 along with an adjacent sense finger on either side of finger 122. Only the details of finger 122 are provided as an example. The remaining sense fingers attached to frame 120 may be similar to finger 122. As described above, once in the drive mode, angular rate sensor 100 is ready to detect angular motion. When there is an angular rate of motion of angular rate sensor 100 about the y-axis, a torque is imparted about the z-axis. This torque causes drive mass 102, and thus frame 120, to twist or rotate, which can be sensed in a sense mode by the sense fingers, such as finger 122.

Referring to finger 122, finger 122 includes a first wall 401 attached to frame 120 and a second wall 402 attached to frame 120. Adjacent wall 406 and wall 401 form an adjacent finger to finger 122, and adjacent wall 404 and wall 402 from another adjacent finger to finger 122. Therefore, each finger is formed with two walls attached to frame 120, in which each wall (except for the walls at the ends of the row of fingers) is shared between two adjacent fingers. The walls of all the fingers are connected at the ends of the walls, as can be seen by end wall 416. Since the walls of the fingers are attached to frame 120, they rotate and move with frame 120.

Within finger 122, attached to substrate 302, are capacitive plates 408 and 412, which can be formed in any form. Capacitive plate 408 includes contacts, such as contact 410, which also provide an anchor to substrate 302, and capacitive plate 412 includes contacts, such as contact 414, which also provide an anchor to substrate 302. Since the capacitive plates are fixed to substrate 302, as frame 120 twists or rotates, the capacitance in the gap between capacitive plate 408 and wall 401 and the capacitance in the gap between capacitive plate 412 and wall 402 changes. That is, the walls of the fingers move with frame 120 to cause the changes in capacitance, and these changes can be sense by circuitry within angular rate sensor to determine the direction and magnitude of angular motion of frame 120. Note that in alternate embodiment, different types of sense fingers or sensing circuitry may be used to detect the angular rotation of drive mass 102 and frame 120. Also, the contacts for the sense fingers, such as contacts 410 and 414, are seen in the top down views of FIGS. 3 and 8.

By now, it should be appreciated how the use of a motion amplification structure can be used to better detect angular rate of motion in an angular rate sensor, such as sensor 100. The motion amplification structure includes a parallel plate actuator, such as drive paddle 110, which is linked via torsion springs to a drive mass 102. The drive paddle pivots around a first pivot point (such as substrate anchor 130) while the drive mass pivots about another pivot point (such as on axis 126), which allows the drive paddle to amplify the motion of the drive mass. Sense fingers may then be used to sense the rotation of the frame surrounding the drive mass, and thus sense Coriolis torques generated through the drive mass velocity and angular rate of sensor 100. In this manner, the desired drive amplitude can be achieved at an achievable quality level of the drive resonance.

Although the described exemplary embodiments disclosed herein are directed to various lateral axis MEMS gyroscope sensor structures and methods for making same, the present invention is not necessarily limited to the example embodiments which illustrate inventive aspects of the present invention that are applicable to a wide variety of MEMS sensor devices, manufacturing methods and operational methodologies. Thus, the particular embodiments disclosed above are illustrative only and should not be taken as limitations upon the present invention, as the invention may be modified and practiced in different but equivalent manners apparent to those skilled in the art having the benefit of the teachings herein. For example, the methodology of the present invention may be applied using drive mass and sense mass structures other than expressly set forth herein. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. The term "coupled," as used herein, is not intended to be limited to a direct coupling or a mechanical coupling. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

The following includes various embodiments of the present invention.

In one embodiment, a MEMS sensor for measuring rotational motion about a first axis includes a frame; a base structure under the frame; a drive mass mounted in the frame for rotational movement about a second axis perpendicular to the first axis; a first drive paddle in the drive mass; a first link including: a first end coupled to a first spring, wherein the first spring movably couples the first drive paddle to the drive mass, and a second end coupled to a second spring, wherein the second spring movably couples the first link to the frame; and a drive system including an electrode aligned to exert electromotive force to pivot the first drive paddle and move the drive mass about the second axis, and deflection of the drive mass is greater than deflection of the first drive paddle when the drive system is operating. In one aspect, the MEMS sensor further includes a cavity in the base structure below the drive paddle, wherein a height of the cavity is sufficient to accommodate the deflection of the drive mass. In another aspect, the MEMS sensor further includes a deflection sense system including a first electrode on the base structure, wherein capacitance between the first electrode and the drive mass increases when the deflection of the drive mass decreases. In another aspect, the MEMS sensor further includes a second drive paddle in the drive mass; a second link including: a first end coupled to a third spring, wherein the third spring movably couples the second drive paddle to the drive mass, and a second end coupled to a fourth spring, wherein the fourth spring movably couples the second link to the frame. In another aspect, the MEMS sensor further includes a sense finger adjacent the frame, wherein the sense finger includes: first and second electrodes anchored to the base structure, a first movable wall on one side of the first and second electrodes, a second movable wall on another side of the first and second electrodes, wherein capacitance between the first electrode and the first movable wall increases when the MEMS sensor rotates in a first direction about a third axis, and capacitance between the second electrode and the second movable wall increases when the MEMS sensor rotates in a second direction about the third axis. In a further aspect, the MEMS sensor further includes a fifth spring coupled between one side of the frame and the drive mass, a sixth spring coupled between an opposite side of the frame and the drive mass, wherein the fifth and sixth springs enable the rotational movement of the drive mass about the second axis. In another aspect, the MEMS sensor further includes a first anchor coupled to the frame, wherein the second spring is formed around the first anchor. In another aspect, the drive mass and the drive paddle are formed from an electrically conductive material. In a further aspect, the first electrode is formed from an electrically conductive material. In a further aspect, the drive mass, the drive paddle, the frame and the sense finger are coplanar when the drive mass and the drive paddle are not being driven, and the sense finger is parallel to the first axis of rotation.

In another embodiment, a transducer adapted to sense rotation about a first axis includes a drive mass mounted to rotate about a second axis; a first drive paddle; a second drive paddle; a frame around a periphery of the drive mass; a first link having a first spring coupled to the drive mass and the first drive paddle on one end and having a second spring coupled to the frame on another end, wherein the first drive paddle and the first link are on one side of the second axis; a second link having a third spring coupled to the drive mass and the second drive paddle on one end and having a fourth spring coupled to the frame on another end, wherein the second drive paddle and the second link are on another side of the second axis. In one aspect, the transducer further includes a base structure under the frame, the drive mass and the first and second drive paddles; a first cavity in the base structure sized to accommodate deflection of the drive mass on the one side of the second axis; a second cavity in the base structure sized to accommodate deflection of the drive mass on the other side of the second axis. In one aspect, the transducer further includes a first drive electrode on the base structure, the first drive electrode is configured to exert electromotive force on the first drive paddle; a second drive electrode on the base structure, the second drive electrode is configured to exert electromotive force on the second drive paddle. In one aspect, the transducer further includes a first measurement electrode configured to measure deflection of the drive mass on the one side of the second axis; a second measurement electrode configured to measure deflection of the drive mass on the other side of the second axis. In one aspect, the transducer further includes sense fingers including first and second sense electrodes between first and second movable walls, wherein capacitance between the first sense electrode and the first movable wall increases when the transducer rotates in one direction about a third axis, and capacitance between the second sense electrode and the second movable wall increases when the transducer rotates in a direction opposite the one direction. In another aspect, maximum deflection of the first and second drive paddles is less than a maximum deflection of the drive mass. In another aspect, the first and second drive paddles are in openings in respective areas of the drive mass, and the first and second drive plates are connected on only one edge to the drive mass by the respective first and third springs. In a further aspect, the first and second drive paddles are closer to the second axis of rotation than the respective first and third springs.

In yet another embodiment, a method of making a transducer adapted to sense rotation about a first axis includes forming a base structure including first and second cavities; forming a rigid, planar drive mass using a conductive material; separating first and second drive paddles from the drive mass in respective areas on respective opposite sides of a second axis of rotation of the drive mass; forming movable links between the first and second drive paddles and edges of the drive mass at the respective areas of the first and second drive paddles; anchoring the drive mass to the base structure so that one outer edge of the drive mass is in the first cavity when the drive mass rotates in a first direction, and an opposite outer edge of the drive mass is in the second cavity when the drive mass rotates in an opposite direction. In one aspect, the method further includes forming sense fingers adjacent the drive mass, wherein the sense fingers include movable portions and stationary portions so distance between one of the movable portions and one of the stationary portions increases during rotation in a first direction of rotation about a third axis, and distance between a second one of the movable portions and a second one of the stationary portions increases during rotation in a second direction of rotation about the third axis.

What is claimed is:

1. A MEMS sensor for measuring rotational motion about a first axis, comprising:
   a frame;
   a base structure under the frame;
   a drive mass mounted in the frame for rotational movement about a second axis perpendicular to the first axis;
   a first drive paddle in the drive mass;
   a first link including:
      a first end coupled to a first spring, wherein the first spring movably couples the first drive paddle to the drive mass, and
      a second end coupled to a second spring, wherein the second spring movably couples the first link to the frame; and
   a drive system including an electrode aligned to exert electromotive force to pivot the first drive paddle and move the drive mass about the second axis, and deflection of the drive mass is greater than deflection of the first drive paddle when the drive system is operating.

2. The MEMS sensor of claim 1, further comprising a cavity in the base structure below the drive paddle, wherein a height of the cavity is sufficient to accommodate the deflection of the drive mass.

3. The MEMS sensor of claim 1, further comprising:
   a deflection sense system including a first electrode on the base structure, wherein capacitance between the first electrode and the drive mass increases when the deflection of the drive mass decreases.

4. The MEMS sensor of claim 3, wherein the first electrode is formed from an electrically conductive material.

5. The MEMS sensor of claim 1, further comprising:
   a second drive paddle in the drive mass;
   a second link including:
      a first end coupled to a third spring, wherein the third spring movably couples the second drive paddle to the drive mass, and
      a second end coupled to a fourth spring, wherein the fourth spring movably couples the second link to the frame.

6. The MEMS sensor of claim 5, further comprising:
   a fifth spring coupled between one side of the frame and the drive mass,
   a sixth spring coupled between an opposite side of the frame and the drive mass, wherein the fifth and sixth springs enable the rotational movement of the drive mass about the second axis.

7. The MEMS sensor of claim 1, further comprising:
   a sense finger adjacent the frame, wherein the sense finger includes:
      first and second electrodes anchored to the base structure,
      a first movable wall on one side of the first and second electrodes,
      a second movable wall on another side of the first and second electrodes, wherein
         capacitance between the first electrode and the first movable wall increases when the frame rotates in a first direction about a third axis, and
         capacitance between the second electrode and the second movable wall increases when the frame rotates in a second direction about the third axis.

8. The MEMS sensor of claim 7, wherein the drive mass, the drive paddle, the frame and the sense finger are coplanar when the drive mass and the drive paddle are not being driven, and the sense finger is parallel to the second axis of rotation.

9. The MEMS sensor of claim 1, further comprising:
   a first anchor coupled to the frame, wherein the second spring is formed around the first anchor.

10. The MEMS sensor of claim 1, wherein the drive mass and the drive paddle are formed from an electrically conductive material.

11. A transducer adapted to sense rotation about a first axis comprising:
   a drive mass mounted to rotate about a second axis;

a first drive paddle;
a second drive paddle;
a frame around a periphery of the drive mass;
a first link having a first spring coupled to the drive mass and the first drive paddle on one end and having a second spring coupled to the frame on another end, wherein the first drive paddle and the first link are on one side of the second axis;
a second link having a third spring coupled to the drive mass and the second drive paddle on one end and having a fourth spring coupled to the frame on another end, wherein the second drive paddle and the second link are on another side of the second axis.

12. The transducer of claim 11, further comprising:
a base structure under the frame, the drive mass and the first and second drive paddles;
a first cavity in the base structure sized to accommodate deflection of the drive mass on the one side of the second axis;
a second cavity in the base structure sized to accommodate deflection of the drive mass on the other side of the second axis.

13. The transducer of claim 12, further comprising:
a first drive electrode on the base structure, the first drive electrode is configured to exert electromotive force on the first drive paddle;
a second drive electrode on the base structure, the second drive electrode is configured to exert electromotive force on the second drive paddle.

14. The transducer of claim 11, further comprising:
a first measurement electrode configured to measure deflection of the drive mass on the one side of the second axis;
a second measurement electrode configured to measure deflection of the drive mass on the other side of the second axis.

15. The transducer of claim 11, further comprising:
sense fingers including first and second sense electrodes between first and second movable walls, wherein capacitance between the first sense electrode and the first movable wall increases when the transducer rotates in one direction about a third axis, and capacitance between the second sense electrode and the second movable wall increases when the transducer rotates in a direction opposite the one direction.

16. The transducer of claim 11, wherein:
maximum deflection of the first and second drive paddles is less than a maximum deflection of the drive mass.

17. The transducer of claim 11, wherein the first and second drive paddles are in openings in respective areas of the drive mass, and the first and second drive paddles are connected on only one edge to the drive mass by the respective first and third springs.

18. The transducer of claim 17 wherein:
the first and second drive paddles are closer to the second axis of rotation than the respective first and third springs.

19. A method of making a transducer adapted to sense rotation about a first axis comprising:
forming a base structure including first and second cavities;
forming a rigid, planar drive mass and a frame around a periphery of the drive mass using a conductive material;
separating first and second drive paddles from the drive mass in respective areas on respective opposite sides of a second axis of rotation of the drive mass;
forming movable links between the first and second drive paddles and the frame;
linking the drive mass to the first and second drive paddles so that one outer edge of the drive mass is in the first cavity when the drive mass rotates in a first direction, and an opposite outer edge of the drive mass is in the second cavity when the drive mass rotates in an opposite direction.

20. The method of claim 19, further comprising:
forming sense fingers adjacent the drive mass, wherein the sense fingers include movable portions and stationary portions so distance between one of the movable portions and one of the stationary portions increases during rotation in a first direction of rotation about a third axis, and distance between a second one of the movable portions and a second one of the stationary portions increases during rotation in a second direction of rotation about the third axis.

* * * * *